(12) United States Patent
Chen

(10) Patent No.: US 10,296,591 B2
(45) Date of Patent: *May 21, 2019

(54) EFFICIENT DATA DISTRIBUTION TO MULTIPLE DEVICES

(71) Applicant: Comcast Cable Communications, LLC, Philadelphia, PA (US)

(72) Inventor: Michael Chen, Wallingford, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/624,178

(22) Filed: Jun. 15, 2017

(65) Prior Publication Data

US 2018/0067934 A1    Mar. 8, 2018

Related U.S. Application Data

(63) Continuation of application No. 13/835,487, filed on Mar. 15, 2013, now Pat. No. 9,710,469.

(51) Int. Cl.
    *G06F 17/30* (2006.01)
(52) U.S. Cl.
    CPC .............. *G06F 17/30023* (2013.01)
(58) Field of Classification Search
    CPC .......... H04N 21/47217; G06F 21/6218; G06F 3/0686; G06F 17/30038; G06F 17/30858
    See application file for complete search history.

(56) References Cited

U.S. PATENT DOCUMENTS

| 7,277,621 | B2* | 10/2007 | Kunieda ........... G06F 17/30817 386/241 |
| 8,001,360 | B2* | 8/2011 | Hansen ............... G06F 9/30014 708/523 |
| 8,370,513 | B2* | 2/2013 | Kim .................. H04L 29/06027 370/232 |
| 8,478,967 | B2 | 7/2013 | Bordelon et al. |
| 9,710,469 | B2 | 7/2017 | Chen |
| 2009/0327215 | A1* | 12/2009 | Zhu ...................... H04N 21/235 |
| 2010/0042235 | A1 | 2/2010 | Basso et al. |
| 2011/0231569 | A1 | 9/2011 | Luby et al. |
| 2012/0210343 | A1 | 8/2012 | McCoy et al. |
| 2013/0166587 | A1 | 6/2013 | Berry |
| 2014/0279852 | A1 | 9/2014 | Chen |

FOREIGN PATENT DOCUMENTS

EP    0926678 A2    6/1999

OTHER PUBLICATIONS

U.S. Appl. No. 13/835,487, filed Mar. 15, 2013, (U.S. Pat. No. 9,710,469), (Jul. 18, 2017), Michael Chen.

* cited by examiner

*Primary Examiner* — Angelica Ruiz
(74) *Attorney, Agent, or Firm* — Ballard Spahr LLP

(57) ABSTRACT

Methods and systems for providing content are disclosed. An example method can comprise identifying a first plurality of data fragments of a media file. An example method can also comprise identifying a second plurality of data fragments of the media file. An example method can comprise generating a manifest file. The manifest file can comprise information for playback of the second plurality of data fragments on a device without access to the first plurality of data fragments.

20 Claims, 5 Drawing Sheets

EFFICIENT DATA DISTRIBUTION TO MULTIPLE DEVICES

CROSS REFERENCE TO RELATED APPLICATION

This application is a continuation of U.S. application Ser. No. 13/835,487, filed Mar. 15, 2013, herein incorporated by reference in its entirety.

BACKGROUND

As content viewing devices become more mobile and widespread, users desire to access content anytime, anywhere, and via a variety of different devices. Users may desire to view the same content on various devices causing multiple downloads of the same files. Providing such services is very demanding on network resources. Thus, there is a need for more sophisticated methods of providing content, for example, to multiple devices.

SUMMARY

It is to be understood that both the following general description and the following detailed description are exemplary and explanatory only and are not restrictive, as claimed. Provided are methods and systems for providing content. An example method can comprise identifying a first plurality of data fragments of a media file. A second plurality of data fragments of the media file can be identified. The first plurality of data fragments and the second plurality of data fragments can comprise fragments of any size, type, or number appropriate for fragmenting a media file. As an illustration, the first plurality of data fragments can comprise the first third of the media file and the second plurality of data fragments can comprise the second two-thirds of the media file. It should be noted the media file can be broken up or fragmented in a variety of proportions. A manifest file can be generated. The manifest file can comprise information for playback of the second plurality of data fragments on a device without access to the first plurality of data fragments.

In one aspect, another example method can comprise providing a first plurality of data fragments of a media file to a first device. A second plurality of data fragments of the media file can be provided to a second device. A manifest file can be provided. The manifest file can comprise information for playback of the second plurality of data fragments on the second device without access to the first plurality of data fragments.

In another aspect, an example method can comprise receiving at least a part of a media file. The media file can comprise a first plurality of data fragments and a second plurality of data fragments. A manifest file can be generated. The manifest file can comprise information for playback of the second plurality of data fragments on a device without access to the first plurality of data fragments. The second plurality of data fragments can be provided as a portion of the media file based on the manifest file.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
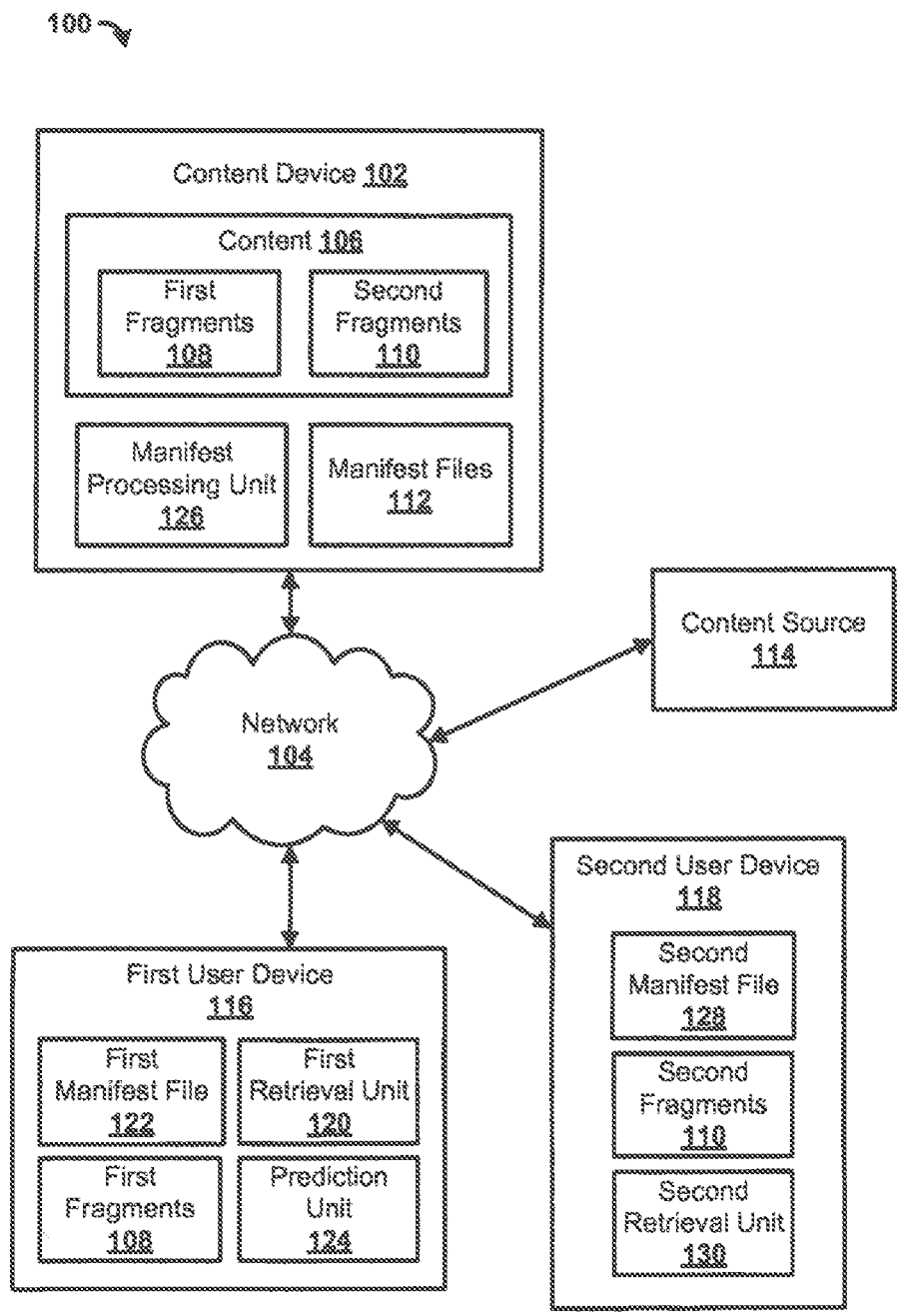
FIG. 1 illustrates various aspects of an example system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to providing content. In one aspect, a portion of content can be provided to a device. The device can have a manifest file configured to instruct the device to play portions of the content without access to the remainder of the content. As an example, a receiving device may only have access to a portion of a content item at a particular time. As such, the receiving device may not be able to access the remainder of the content, for example, because of limited connectivity. Though manifest files are generally provided for playback of media file, many devices are unable to provide playback when a portion of the content (e.g., the beginning portion of the content) is not accessible by the device. Accordingly, a manifest file can be generated that allows devices to provide playback of a portion of the media file without having access to other portions of the media file.

FIG. 1 illustrates various aspects of an example system 100 in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware. In an exemplary embodiment, the methods and systems disclosed can be located within one or more of a prediction unit, a manifest processing unit, a first retrieval unit, a second retrieval unit or other element described in greater detail below.

In one aspect, the system 100 can comprise a content device 102. For example, the content device 102 can comprise a server or other computer device. The content device 102 can be configured to provide content through a network 104. The network 104 can comprise network adapters, switches, routers, and the like connected through wireless links (e.g., radio frequency, satellite) or physical links (e.g., fiber optic cable, coaxial cable, Ethernet cable). In one aspect, the network 104 can be configured to provide communication from telephone, cellular, modem, and/or other electronic devices to and throughout the system 100. The network 104 can comprise a content distribution network and/or content access network. For example, the network 104 can comprise a quadrature amplitude modulation based network and/or and internet protocol based network to deliver content to a plurality of user devices 116 and 118.

The content device 102 can comprise data, such as content 106. For example, the content 106 can comprise one or more media files associated with a show, movie, broadcast, or other programming. The content 106 can comprise a first plurality of data fragments 108 ("first fragments") and a second plurality of data fragments 110 ("second fragments"). Additionally, the content device 102 can comprise one or more manifest files 112. In one aspect, the manifest files 112 can comprise an index of data fragments. The data fragments can together comprise some or all of a content file. The index can comprise an index value associated with each data fragment. The index values can indicate temporal order for playback of the data fragments. For example, the index values can be time values according to a time length of playback of the content. The time values can be based on a time scale associated with the content. As a further example, the time scale can begin at beginning of the content and end at the end of the content. In another aspect, the index value can comprise a number indicating the place of the data fragment in the sequential order of playback.

In one aspect, the manifest files 112 can comprise location identifiers configured to indicate the location where the data fragments can be accessed. For example, the location of each data fragment can be indicated by a uniform resource identifier, such as a uniform resource locator (URL). The URL can comprise, for example, a hypertext transfer protocol link or other link. The data fragments indicated in the manifest files 112 can comprise the first fragments 108 and/or second fragments 110 located at the content device 102. As another example, the data fragments can be located at a content source 114 configured to provide content through the network 104. The content source can be a third party content device, edge device, or other content delivery device. It should be understood that some or all of the content 106 (e.g., first fragments, second fragments) and manifest files can be located at the content source 114.

In one aspect, the manifest files 112 can comprise access restrictions associated with the data fragments. For example, the manifest files 112 can comprise instructions that specific data segments are not to be skipped in playback of the content 106. In another aspect, the manifest files 112 can comprise resolution information. For example, the manifest files 112 can indicate that certain data fragments are associated with a specific playback resolution (e.g., 480p, 720p, 1080p, and the like). In one aspect, the manifest files 112 can comprise indications of media format (e.g., MIME types such as video/mp4), type of delivery (e.g., live streaming format with access patterns that accommodate potentially infinite duration, or on-demand format where the content duration is known and finite), digital rights management (DRM) information used for playback, indications for multilingual content (e.g., audio and data fragments associated with specific languages), and the like. In another aspect, in scenarios in which data fragments are part of a recording, the manifest files 122 can comprise recording information, such as when recorded and duration. It should be noted, however, that some manifest files 112 for recorded content can use a live access pattern, rather than an on-demand pattern, for content that was recorded as live. For example, content that was recorded live can comprise a specific duration, length, or amount of data after the recording is completed, but in some cases, the content can still be treated, for purposes of data access and delivery, as live content.

In one aspect, the system 100 can comprise a plurality of user devices configured to receive content and other information through the network 104. For example, the system 100 can comprise a first user device 116. The system 100 can also comprise a second user device 118. In one aspect, the first user device 116 and second user device 118 can be associated with the same user. For example, the first user device 116 can be a set top box, digital streaming device, cable box, television, computer device, or the like. The second user device 118 can be a mobile device, such as a portable computer, tablet device, mobile phone, or the like. In some scenarios, however, the second user device 118 can be a more stationary device such as a set top box, digital streaming device, cable box, television, computer device, or the like.

In one aspect, the first user device 116 can comprise a first retrieval unit 120. For example, a user can request playback of the content 106 at the first user device 116. The first retrieval unit 120 can request a first manifest file 122 from the content device 102. The first manifest file 122 can be associated with the content requested by the user. The first manifest file 122 can be selected from one of the manifest files 112 at the content device 102. The requested content 106 can comprise the first fragments 108 and the second fragments 110. The first user device 116 can receive the first manifest file 122. In one aspect, the first retrieval unit 120 can be configured to process (e.g., read) manifest files 112 to identify the locations of data fragments listed in the manifest files. Additionally, the first retrieval unit 120 can be configured to retrieve the data fragments from the locations listed in the manifest files 112. Accordingly, the first retrieval unit 120 can process the first manifest file 122 and identify the locations of the first fragments 106 and second fragments 108. The first retrieval unit 120 can retrieve some or all of the first fragments 106 and second fragments 108 according to the playback requested by the user. For example, as the user requests playback of a particular portion of the content, the first retrieval unit 120 can retrieve the data fragments that comprise the particular portion of the content. In one aspect, the retrieval unit 120 can retrieve a specified amount of data fragments in advance of playback, thereby forming a playback buffer.

In one aspect, the first user device 116 can comprise a prediction unit 124 configured to predict which data fragments to retrieve in advance of playback. The prediction unit 124 can be configured to predict which portions of the requested content 106 will be viewed by the user at the first user device 116 and which portions of the requested content will be viewed at another user device, such as the second user device 118. For example, the prediction unit 124 can predict that the user will watch a portion of the content comprising the first fragments 108 on the first user device 116. The prediction unit 124 can determine (e.g., generate, receive) a prediction that the user will watch another portion of the content comprising the second fragments 110 on the second user device 118. Accordingly, the prediction unit 124 can be configured to provide the prediction to the content device 106 and/or the second user device 118. The second user device 118 can receive the second fragments 110 in advance of the user attempting playback of second fragments 110 on the second device. For example, the second fragments 110 can be received at the second user device 118 while the user is viewing the first fragments 108 at the first user device 116.

In one aspect, the prediction unit 124 can determine the prediction based on a user instruction. For example, the user can pause playback of the content 106 on the first user device 116. As a further example, the prediction unit 124 can infer that PAUSE instruction is likely to be resumed on the same device, while a STOP or EXIT instruction is likely to be resumed later on the second user device 118. The prediction unit 124 can request an instruction from the user to download the remaining data fragments (e.g., second fragments 110) or otherwise resume playback of the content 106 at the second user device 118. As another example, the user can otherwise interact (e.g., click) with an interface element (e.g. a button, link) indicating the user's intention to playback a second portion of the content on the second user device 118. Accordingly, the second user device 118 can receive the second fragments 110 in advance of the user switching to the second user device 118. The second user device 118 can prioritize download of some of the second fragments 110 based on the user instruction. For example, if the user continues to watch the content 106 from the first user device 116, the second user device 118 can begin download of some of the second fragments 110 closest to the end of the content 106. Then, the second user device 118 can proceed by downloading data fragments prior in time sequence until the first user device 116 completes a certain portion of playback (e.g., when both devices had downloaded the same data fragment of the second fragments 110)

In another aspect, the prediction unit 124 can determine the prediction based on a user history. For example, the prediction unit 124 can collect a viewing history of the user that indicates when the user switched playback from the first user device 116 to the second user device 118. As an illustration, the user might regularly playback a first portion of a content (e.g., television show, movie, news program) at a certain time of day on the first user device 116 but then switch to playback of a second portion of the content 106 on the second user device 118. In one scenario, a user might watch the first portion while eating and watch the second portion while traveling. In another scenario, the user might watch the first portion while in the kitchen and watch the second portion in another room of the home. In one aspect, the prediction unit 124 can analyze the viewing history for downloaded content to determine the typical duration of viewing on the second user device 118 in order to predict the portion of content 106 most likely to be viewed on the second user device 118. For example, if the user views X minutes of content 106 on the second user device 118 while disconnected from the network 104 (e.g., while traveling), the prediction unit 124 can generate a prediction to prioritize download for disconnected viewing for the next Y minutes from a resume point. The resume point can be a data fragment, such as one of the second fragments 110, where the user is predicted to resume playback of the content 106 on the second user device 118. For example, a user may view 5, 10, 15, 20, 30 or another number of minutes of content on a first user device 116. The user may also view the remaining 5, 10, 15, 20, 30 or other number of remaining minutes of the content on a second user device 118. Then the prediction unit 124 can generate a prediction to prioritize download of the remaining 5, 10, 15, 20, 30 or other number of remaining minutes on the second user device 118. It should be noted, however, that the user can view or otherwise consume any number of minutes of content on the first user device 116 and any number of remaining minutes of the content on the second user device 118.

In one aspect, the prediction unit 124 can analyze viewing behavior for content downloaded to the second user device 118 to determine the typical duration of each disconnected view in order to predict the portion of content (e.g., second fragments 110) most likely to be viewed at the second user device 118. For example, if the user eventually views the entire remaining portion of content downloaded to the second user device 118 but views X minutes of content while disconnected each time (e.g., which may be the duration of the user's daily mass transit commute in each direction), then the prediction unit 124 can prioritize download to the second user device 118 for disconnected viewing of the next X minutes from the resume point. For example, a user may view a part of the content on a first user device 116 and an additional 5, 10, 15, 20, 30 or another number of minutes of content on a second user device 116. The additional number of minutes may be less than the total number of remaining minutes. Accordingly, then the prediction unit 124 can generate a prediction to prioritize download of the additional 5, 10, 15, 20, 30 or other number of remaining minutes on the second user device 118. The additional number of minutes can be prioritized over other remaining minutes. The other remaining minutes can be viewed, for example, at the first user device 116, at the second user device at a later time, or other similar scenario. It should be noted, however, that the user can view or otherwise consume any number of minutes of content on the first user device 116 and any number of remaining minutes of the content on the second user device 118.

In another aspect, the prediction unit 124 can determine the prediction based on one or more user preferences. The user can provide a user preference indicating which portion of content to download to which devices at what time of day. For example, the user can specify in a user preference that the user intends to watch the portion of the content comprising the second fragments from the second user device 118 at a certain time of day. Accordingly, the second user device 118 can receive the second fragments 110 in advance of the user's expected playback time.

In one aspect, the prediction unit 124 can identify how the user responds to content downloads initiated based on the prediction ("predictive downloads"). For example, the prediction unit 124 can identify which predictive downloads are discarded by the user. In one aspect, the prediction unit 124 can minimize the amount of predictive downloads being discarded without viewing by providing an instruction to deprioritize or cancel download of portions of the content 106 that the user does not view. For example, if a user watches a nightly news broadcast and the user typically watches only the sports portion X minutes from the beginning of the broadcast, then the other portions of the broadcast can be downloaded last or not at all. As another example, if advertisement skipping is permitted, and the customer typically skips advertisements, the advertisements can be downloaded last or not at all. For example, the user may watch the sports portion 5, 10, 20, 30 or another number of minutes into a news program. Thus, the prediction unit 124 can provide an instruction to deprioritize portions of content during the first 5, 10, 20, 30 or other number of minutes that occur before the sports portion of the news program. It should be noted, that the prioritized content can be located at any number of minutes within the content.

In another aspect, the prediction unit 124 can minimize the amount of predictive downloads being discarded without viewing by providing an instruction to download alternate versions of portions of the content 106 that the user does not view. For example, if for a nightly news broadcast the user typically watches only the sports portion X minutes from the beginning of the content, then smaller versions of the other data fragments can be downloaded such as data fragments at lower bit-rates. As another example, if advertisement revenue is not affected, smaller versions of advertisements can be downloaded such as lower bit-rate versions or alternate length advertisements associated with the same campaign.

In one aspect, the prediction unit 124 can minimize the amount of predictive downloads being discarded without viewing by providing an instruction to prioritize download of content portions that the user is likely to view. For example, if the user typically watches the sports portion X minutes from the beginning of the nightly news broadcast, downloads of those portions can be prioritized. As another example, if the customer typically watches a certain category of shows (e.g., cooking, sports, news), and indicates that a mid-morning talk show should be downloaded that the user usually does not watch, an instruction can be provided to prioritize download of content portions related that category. As another example, the prediction unit 124 can inspect viewing history, a history of recommendations (e.g., likes, dislikes), program metadata, and the like to estimate which content 106 the user is likely to view. Based on this information, the prediction unit 124 can provide an instruction to increase the priority to download a portion of the content 106 for predictive download (e.g., when the customer is more likely to watch this series than others, and more likely to watch new episodes than repeats). For example, if the user typically watches cooking shows, then the prediction unit 124 can identify cooking content in a particular show. The prediction unit 124 can identify the cooking content through metadata, natural language processing, or other similar technique. The prediction unit 124 can provide an instruction to deprioritize downloading portions of the show during the first 5, 10, 20, 30 or other number of minutes that occur before the cooking portion of the show. It should be noted, that the prioritized content can be located at any number of minutes within the content.

In one aspect, the prediction unit 124 can minimize the amount of predictive downloads being discarded by providing an instruction to deprioritize or cancel downloads for content 106 that is more commonly downloaded and viewed on other devices. For example, one user at a home can download and watch sports on a tablet device, and another user at the same home can download and watches dramas on a mobile phone device.

In one aspect, the prediction unit 124 can minimize the amount of predictive downloads being discarded by deprioritizing or canceling downloads for content on devices that are less commonly downloaded and subsequently viewed by the authenticated user. For example, one user can download and watches sports and another user can download and watch dramas. If these two users share a tablet, but only one of the users is currently authenticated, then the prediction unit 124.

In one aspect, the prediction unit 124 can minimize the amount of predictive downloads being discarded without viewing by providing an instruction to prioritize portions of content or alternate versions of content that the user is mandated to view. For example, if advertisement skipping is not allowed, the second user device 118 can download mandated advertisements first. For example, an advertisement the user is mandated to view can be any advertisement identified by the advertiser and/or content provider. As a further example, for advertisements associated with free content, the user can be mandated to view all advertisements associated with the content.

In one aspect, the prediction unit 124 can minimize the amount of predictive downloads being discarded without viewing by providing an instruction to prioritize based on search history. The search history can comprise searches for the content or metadata related to the content. For example, if there is a specified number of searches for a term (e.g., "once"), then content comprising that term (e.g., "Once Upon A Time") can be prioritized. As another example, if a term (e.g., "soccer") is searched a certain number of times, then content related to that term (e.g., "English Premier League") can be prioritized. The search history can also comprise a history of non-selection. For example, if a term (e.g., "soccer") is searched a certain number of times and one of the search results (e.g., "Italian League Soccer") is not selected a certain number of times, then the non-selected search result can be deprioritized.

In one aspect, the content device 102 can comprise a manifest processing unit 126 configured to generate (e.g., create, modify) manifest files 112. The manifest processing unit 126 can be configured to create and/or modify a manifest file 112 so that a user device can playback some data fragments of the content 106 without having access to all the data fragments of the particular content. For example, the manifest processing unit 126 can generate a second manifest file 128 configured for playback of the second fragments 110 on a device without access to the first fragments 108. The manifest processing unit 126 can generate the second manifest file 128 based on the first manifest file 122. The second manifest file 128 can be configured to allow the second user device 118 to playback the second fragments 110 without access to the first fragments 108. As an illustration, some user devices may encounter errors when attempting playback of data fragments based on the first manifest file 116 without the presence of other data fragments (e.g., prior data fragments). Accordingly, the manifest processing unit 126 can generate manifest files that enable the user devices to perform playback of the data fragments without errors.

In one aspect, the manifest processing unit 126 can identify the first fragments 108 and the second fragments 110. For example, the first fragments 108 and/or the second fragments 110 can be identified in the first manifest file 122 or similar index file. As another example, the first fragments 108 and/or the second fragments 110 can be identified in a database (e.g., at the content source 114, content device 102, first user device 116, or second user device 118) or other file associated with the content 102. In one aspect, the locations of some or all of the first fragments 108 and/or the second fragments 110 can be identified. For example, the first manifest file 122 can be processed (e.g., read, parsed, searched) to identify the locations of the first fragments 108 and/or the second fragments 110. As another example, some or all of the first fragments 108 and/or the second fragments 110 can be identified at a local storage location and/or a remote storage location. In one aspect, depending on the location of the manifest processing unit 126, the local storage location and/or remote storage location can be located at one or more of the first user device 116, second user device 118, content device 102, content source 114, or other device accessible through the network 104. In one aspect, the first fragments 108 and/or the second fragments 110 can be identified as (e.g., or after) the first fragments 108 and/or the second fragments 110 are received or otherwise accessed by the manifest processing unit 126.

In one aspect, the manifest processing unit 126 can generate the second manifest file 128 by re-indexing the first manifest file 122. For example, a first index value associated with one of the second fragments 110 can be replaced with a second index value. In one aspect, replacing can comprise replacing within a given file or generating a new file with a new value instead of the old value. The index values associated with the first fragments 108 can be removed. At least some of the index values associated with the second fragments 110 can be replaced with index values originally associated with the first fragments 108. As another example, the index values can comprise time values. The time values of the second fragments 110 can be replaced with time values indicating that the second fragments 110 are first in temporal order of the content. As an illustration, the first manifest file 122 can have time values X, Y, and Z. Time value X can represent the first time value at the start of the content, and time value Z can represent the last time value at the end of the content. If the second fragments 110 begin at time value Y and end at time value Z, then the manifest processing unit 126 can generate the second manifest file 128 by replacing time value X in the first manifest file 122 with a new time value (e.g., time value Y) marking the beginning of the content for the purposes of the second manifest file 128. For example, X can be a time value of 0, Y can be a time value of 10 minutes, and Z can be a time value of 30 minutes. Accordingly, a time value of 10 minutes can be assigned as a time value of 0. Additionally, all the time values up until 10 minutes can be removed from the manifest file. All time values after 10 minutes can be replaced with time values following 0 minutes. It should be noted, that any time values can be used for X, Y, and Z.

In one aspect, the manifest processing unit 126 can generate the second manifest file 128 by replacing (e.g., replacing within a file, using as the basis for a new file) location identifiers. For example, a location identifier associated with a one of the second fragment 110 listed in the first manifest file 122 can be replaced with a new location identifier. The location identifier can comprise a uniform resource identifier, such as a uniform resource locator (URL). The URL can comprise a hypertext transfer protocol link or other link. For example, the new location identifiers can indicate locations on the second user device 118 rather than the first user device 116. In one aspect, replacing and/or generating new location identifiers can comprise replacing and/or generating a new data naming scheme. For example, the second device can utilize different data storage techniques than utilized in the first user device and/or content device 102. The difference in data storage techniques can result in the data being named and/or stored differently. For example, in some cases, such as offline viewing, the naming scheme used to download content (e.g., http: or https:) can be replaced with a naming scheme for localized playback (e.g., file:). As another example, a naming scheme implementing transport level security can be replaced with a naming scheme that no longer implements transport level security (e.g., downloaded with https but locally playable with http). As another example, a naming scheme used in a content distribution network (CDN) can be replaced with a simplification of the CDN naming scheme, such as flattening of a CDN folder path to a content or download identifier based folder. For example, for download identifier X (e.g., a number such as 4), the following path "/abc/342349f/ kjbwkjebckwbec/_" can be replaced with "X/_" (e.g., when the local user device has a much less cluttered namespace for the user device downloads).

In one aspect, the manifest processing unit 126 can generate the second manifest file 128 by replacing location identifiers for data fragments of a first resolution with location identifiers for fragments of a second resolution. For example, the second user device 118 can be configured such that some resolutions (e.g., 1080p, 780p) are not supported. If the first resolution is not supported by the second user device 118, then the manifest processing unit 126 can replace the location identifiers of the second fragments 110 associated with the first resolution with location identifiers of second fragments 110 associated with a second resolution. The second fragments 110 associated with the second resolution can be located at the content device 102, content source 114, or at the second user device 118 (e.g., from a local encoding server or local storage).

In one aspect, the manifest processing unit 126 can generate the second manifest file 128 by associating one or more data fragments with access restrictions. For example, the access restrictions can prohibit the second user device 118 from skipping some of the second fragments 110 or otherwise control the user's interaction with some of the second fragments 110. As a further example, the data fragments associated with access restrictions can be data fragments associated with an advertisement.

In one aspect, the manifest processing unit can 126 can generate the second manifest file 128 by replacing or generating one or more annotations associated with data fragments. As an example, an annotation can comprise a bookmark or other chaptering information. As another example, a data fragment can be annotated as live content indicating that the content is being received from a live broadcast. When, the user requests playback of the second fragments 110 from the second user device 118, the content may no longer be live content. Accordingly, the manifest processing unit 126 can change annotations associated with the second fragments 110 to indicate that the second fragments 110 are not provided as live content.

As another example, annotations can comprise closed captioning track correlation. For example, if the original manifest references live video and audio and another system generates closed captioning track information, the annotation can identify closed captioning data fragments that correspond to the video/audio fragments and/or the fragments' shared timeline. Annotations can also comprise digital program insertion signaling. For example, content can be associated with an advertisement placement identifier. Annotations can comprise program metadata. For example, the program metadata can indicate content associated with a series identifier and/or episode identifier. As another example, program metadata can indicate content broadcast from a particular network. Annotations can comprise enhanced/interactive TV signaling information. For example, a portion of content portion can be indicated as part of an enhanced and/or interactive TV application. The enhanced or interactive annotation can trigger behavior in various applications. Annotations can comprise sports information, such as score or play-by-play metadata for sports content. Annotations can also comprise social media metadata. For example, social media metadata can associate keywords and/or hash tags used in social media with a portion of content.

In one aspect, the second user device 118 can comprise a second retrieval unit 130 configured to retrieve and/or receive the second manifest file 128 and second fragments 110. For example, the second retrieval unit 130 can receive predictions from the prediction unit 124. The second retrieval unit 130 can request and/or receive the second fragments 110 based on the prediction. According to various implementations, the second fragments 110 can be received from the first user device 116, content device 102, and or content source 114. Additionally, the second retrieval unit 130 can request and/or receive the second manifest file 130. The second manifest file 128 can be received from the first user device 116, content device 102, content source 114, or can be generated locally by the second user device 116. For example, the manifest processing unit 126 can be located (e.g., fully or partially implemented) at the content device 102, first user device 116, second user device 118, and/or content source 114. Additionally, the prediction unit 124 can be located (e.g., fully or partially implemented) at the first user device 116, second user device 118, content source 114, and/or content device 102. Furthermore, the second manifest file 128 and/or second fragments can be generated and/or retrieved by a packager (e.g., just in time packager) configured to provide the data fragments 108 and 110 and/or manifest files 112 in formats acceptable to the requesting device. The packager can be located at the content device 102, content source 114, and first user device 116, and/or second user device 118.

Figure 2:
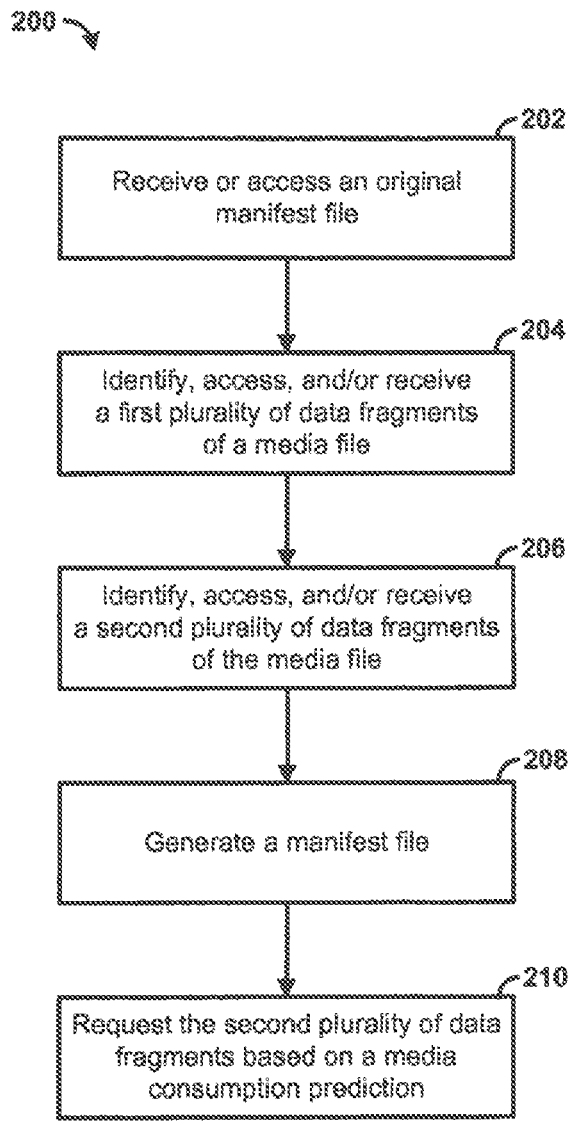
FIG. 2 is a flowchart illustrating an example method for providing content.

FIG. 2 is a flowchart illustrating an example method 200 for providing content. In step 202, an original manifest file configured for playback of a media file can be received. In one aspect, the media file can comprise a first plurality of data fragments and a second plurality of data fragments. The original manifest file can be configured to facilitate playback of the media file. The original manifest file can be customized based on the hardware and/or software specifications of an original receiving device. The original receiving device can have access to the first plurality of data fragments and second plurality of data fragments during or for playback of the media file. For example, the original receiving device can be connected to a network. The network can provide access to the first plurality of data fragments and the second plurality of data fragments.

In step 204, the first plurality of data fragments can be identified. For example, the first plurality of data fragments can be identified in the original manifest file. As another example, the first plurality of data fragments can be identified in a database or other file associated with the media file. In one aspect, the locations of some or all of the first plurality of data fragments can be identified. For example, the original manifest file can be processed (e.g., read, parsed, searched) to identify the locations of the first plurality of data fragments. As another example, some or all of the first plurality of data fragments can be identified at a local storage location (e.g., set top box, or other user device) and/or a remote storage location (e.g., content device or edge device in a content delivery and/or access network). In one aspect, the first plurality of data fragments of a media file can be received or accessed. The first plurality of data fragments can be identified as (e.g., or after) the first plurality of data fragments are received or accessed. For example, the media file can be received as a transmission, e.g., a stream of video, audio, and/or data.

In step 204, the second plurality of data fragments can be identified. For example, the second plurality of data fragments can be identified in the original manifest file. As another example, the second plurality of data fragments can be identified in a database or other file associated with the media file. In one aspect, the locations of some or all of the first plurality of data fragments can be identified. For example, the original manifest file can be processed (e.g., read, parsed, searched) to identify the locations of the second plurality of data fragments. As another example, some or all of the first plurality of data fragments can be identified at a local storage location (e.g., set top box, or other user device) and/or a remote storage location (e.g., content device or edge device in a content delivery and/or access network). In one aspect, the second plurality of data fragments of the media file can be received or accessed. The second plurality of data fragments can be identified as (e.g., or after) the first plurality of data fragments are received or accessed.

The first plurality of data fragments and the second plurality of data fragments can comprise fragments of any size, type, or number appropriate for fragmenting a media file. As an illustration, the first plurality of data fragments can comprise the first third of the media file and the second plurality of data fragments can comprise the second two-thirds of the media file. It should be noted the media file can be broken up or fragmented in a variety of proportions. For example, the number of the first plurality of data fragments or second plurality of data fragments can be based on the number of data fragments received by a particular device. For example, the number of the first plurality of data fragments can be based on the number of fragments received at a first device, and the number of the second plurality of data fragments can be based on the number fragments received at a second device.

In step 212, a manifest file can be generated. For example, generating the manifest file can comprise modifying or otherwise adapting the original manifest file, modifying or otherwise adapting a copy of the original manifest file, or creating a new manifest file. In one aspect, the manifest file can comprise information for playback of the second plurality of data fragments on a device without access to the first plurality of data fragments. The device can be at least temporarily without access to the first plurality of data fragments because of, for example, network connectivity. The device can at least temporarily be unable to access the first plurality of data fragments from a local and/or remote location. The device can perform playback without access to the first plurality of data fragments. The device can receive the second plurality of data fragments to a local storage cache on the device. The device can be a mobile device configured to travel in locations where the first plurality of data fragments is at least temporarily inaccessible through a network. Information for playback of the second plurality of data fragments can comprise at least one of a temporal playback order of the second plurality of data fragments and location identifiers indicating locations at which to retrieve the second plurality of data fragments. In one aspect, the device can be a mobile device, set-top box, streaming device, computing device, or the like.

In one aspect of step 212, a first index value associated with a data fragment can be replaced with a second index value. In one aspect, replacing can comprise modifying a value (e.g., index value, location identifier, access restriction, or other value in a manifest file) in the manifest file or generating a new manifest file with a different value than a value in the original manifest file. As an example, the first index value can comprise a first time value and the second index value can comprise a second time value. As another example, the first index value and second index value can comprise a numbers in a sequence indicating the order of the fragments.

In one aspect of step 212, a first location identifier indicating a first location of a data fragment can be replaced with a second location identifier indicating a second location of the data fragment. For example, a first data fragment naming scheme can be replaced with a second data fragment naming scheme. As another example, a first uniform resource locator can be replaced with a second uniform resource locator. For example, the first uniform resource locator can point to a remote location on a network, and the second uniform resource location can point to a location on the device. In one aspect of step 208, access restriction instructions can be associated with a data fragment. For example, the data fragment can be part of an advertisement. The access restriction instructions can indicate the fragment can not be skipped and/or deleted. In another aspect of 208, the manifest file can be generated based on an original manifest file. The original manifest file can specify that the second plurality of data fragments are in order of time of playback after the first plurality of data fragments. For example, the device can be unable to provide playback based on the original manifest file. In one aspect, the device can be unable to access a portion of the media file. The device can receive some of the media file (e.g., the second plurality of data fragments) but then be unable to continue receiving the remainder of the media file (e.g., the first plurality of data fragments) due to network connectivity problems, memory constraints, storage constraints, hardware failures, or the like. Accordingly, the manifest file can be generated to provide playback of the downloaded portion of the media file.

In step 210, the second plurality of data fragments can be requested based on a media consumption prediction. The media consumption prediction can be based on at least one of a device usage history, media download history, and a media viewing history. For example, the media consumption prediction can be a prediction by the prediction unit 124 of FIG. 1. As another example, the second plurality of data fragments can be requested for the device, which in some implementations can comprise a different device than the device performing step 208, 206, 204, and/or 202. In other implementations, all steps can be performed on one device or a variety of devices.

Figure 3:
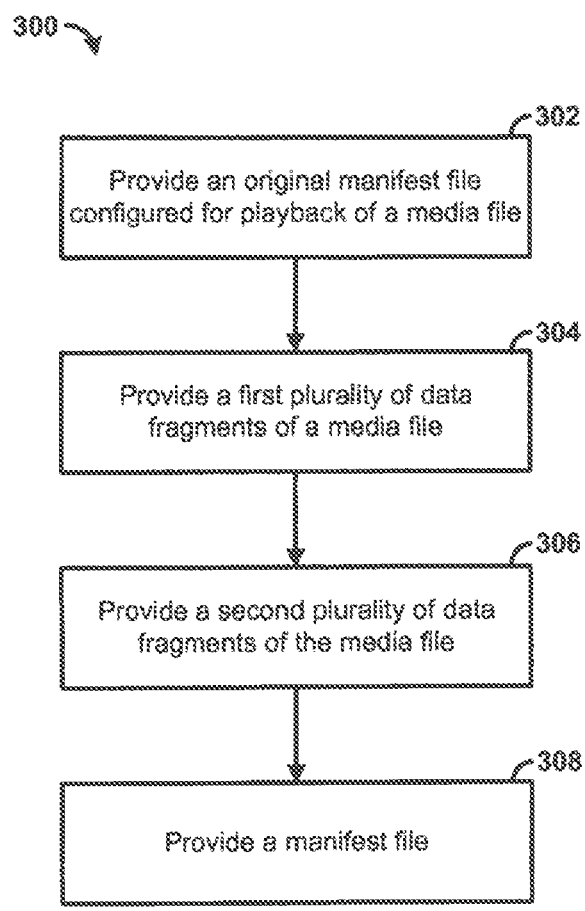
FIG. 3 is a flowchart illustrating another example method for providing content.

FIG. 3 is a flowchart illustrating another example method 300 for providing content. In step 302, an original manifest file associated with a media file can be provided. In one aspect, the original manifest file can comprise information for playback of the media file. The original manifest file can be configured to facilitate playback of the media file. The original manifest file can be customized based on the hardware and/or software specifications of an original receiving device. The original receiving device can have access to the first plurality of data fragments and second plurality of data fragments during playback of the media file. For example, the original receiving device can be connected to a network. The network can provide access to the first plurality of data fragments and the second plurality of data fragments. In step 304, a first plurality of data fragments of a media file can be provided. For example, the first plurality of data fragments of a media file can be provided to a first device. For example, a user of the first device can request playback of the media file and begin viewing the first plurality of data fragments after at least a portion of the first plurality of data fragments are downloaded to the first device.

In step 306, a second plurality of data fragments of the media file can be provided. For example, the second plurality of data fragments of the media file can be provided to a second device. In one aspect, the second device is a mobile device, such as a mobile phone, laptop, tablet, or other handheld device. In another aspect, the second device is a set-top box, streaming device, television, computer device, or the like. For example, the second plurality of data fragments can be provided to the second device based on a media consumption prediction. The media consumption prediction can be based on at least one of a device usage history, media download history, and a media viewing history. For example, the media consumption prediction can be a prediction by the prediction unit 124 of FIG. 1.

In step 308, a manifest file can be provided. For example, the manifest file can be a modified or otherwise adapted manifest file, a modified or otherwise adapted copy of a manifest file, or a new manifest file. The manifest file can comprise information for playback of the second plurality of data fragments on the second device without access to the first plurality of data fragments. The second device can be at least temporarily without access to the first plurality of data fragments because of for example, network connectivity. The second device can at least temporarily be unable to access the first plurality of data fragments from a local and/or remote location. The second device can perform playback without access to the first plurality of data fragments. The second device can receive the second plurality of data fragments to a local storage cache on the second device. The second device can be a mobile device configured to travel in locations where the first plurality of data fragments is at least temporarily inaccessible through a network. In one aspect, information for playback of the second plurality of data fragments can comprise at least one of a temporal playback order of the second plurality of data fragments and location identifiers indicating locations at which to retrieve the second plurality of data fragments.

In one aspect, the manifest file can be generated based on an original manifest file. For example, the manifest file can be a modified copy of the original manifest file. As another example, the manifest file can be a newly created manifest file. The original manifest file can specify that the second plurality of data fragments are in order of time of playback after the first plurality of data fragments. For example, the second device can be unable to provide playback based on the original manifest file. In one aspect, the second device can be unable to access a portion of the media file. The second device can receive some of the media file (e.g., the second plurality of data fragments) but then be unable to continue receiving the remainder of the media file (e.g., the first plurality of data fragments) due to network connectivity problems, memory constraints, storage constraints, hardware failures, or the like. Accordingly, the manifest file can be generated to provide playback of the downloaded portion of the media file.

In one aspect, a first index value associated with a data fragment can be replaced with a second index value. The first index value can comprise a first time value, and the second index value can comprise a second time value. In one aspect, a first location identifier indicating a first location of a data fragment can be replaced with a second location identifier indicating a second location of the data fragment. For example, a first data fragment naming scheme can be replaced with a second data fragment naming scheme. As another example, a first uniform resource locator can be replaced with a second uniform resource locator. For example, the first uniform resource locator can point to a remote location on a network, and the second uniform resource locator can point to a location on the device.

In another aspect, access restriction instructions can be associated with a data fragment. In another aspect, a uniform resource locator configured to locate a first data fragment can be inserted. In another aspect, a uniform resource locator configured to locate a second data fragment can be replaced with the uniform resource locator configured to locate the first data fragment.

Figure 4:
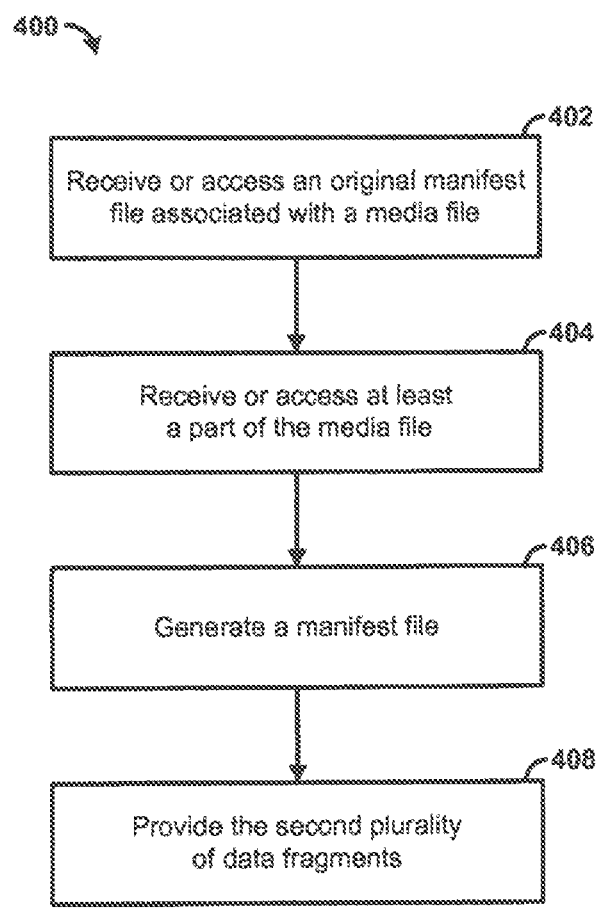
FIG. 4 is a flowchart illustrating yet another example method for providing content.

FIG. 4 is a flowchart illustrating yet another example method for providing content. In step 402, an original manifest file associated with a media file can be received or accessed. For example, the original manifest file can be received in response for a request for playback of the media file. The media file can comprise a first plurality of data fragments and a second plurality of data fragments. The original manifest file can comprise information for playback of the media file. The original manifest file can be configured to facilitate playback of the media file. The original manifest file can be customized based on the hardware and/or software specifications of an original receiving device. The original receiving device can have access to the first plurality of data fragments and second plurality of data fragments during playback of the media file. For example, the original receiving device can be connected to a network. The network can provide access to the first plurality of data fragments and the second plurality of data fragments. The original manifest file can comprise a list (e.g., index) of data fragments (e.g., first plurality of data fragments, second plurality of data fragments) of the media file. In step 404, at least a part of the media file can be received or accessed. For example, the first plurality of data fragments can be received in response to a request for playback of the first plurality of data fragments.

In step 406, a manifest file can be generated. For example, generating the manifest file can comprise modifying or otherwise adapting a manifest file, modifying or otherwise adapting a copy of a manifest file, or creating a new manifest file. The manifest file can comprise information for playback of the second plurality of data fragments on a device without access to the first plurality of data fragments. The device can be at least temporarily without access to the first plurality of data fragments because of, for example, network connectivity. The device can at least temporarily be unable to access the first plurality of data fragments from a local and/or remote location. The device can perform playback without access to the first plurality of data fragments. The device can receive the second plurality of data fragments to a local storage cache on the device. The device can be a mobile device configured to travel in locations where the first plurality of data fragments is at least temporarily inaccessible through a network. For example, the device can comprise a mobile device, set-top box, streaming device, television, or the like.

In one aspect, information for playback of the second plurality of data fragments can comprise at least one of a temporal playback order of the second plurality of data fragments and location identifiers indicating locations at which to retrieve the second plurality of data fragments. In one aspect, a first index value associated with a data fragment can be replaced with a second index value. The first index value can comprise a first time value, and the second index value can comprise a second time value. In one aspect, a first location identifier indicating a first location of a data fragment can be replaced with a second location identifier indicating a second location of the data fragment. For example, a first data fragment naming scheme can be replaced with a second data fragment naming scheme. As another example, a first uniform resource locator can be replaced with a second uniform resource locator.

In one aspect, access restriction instructions can be associated with a data fragment. In one aspect, a uniform resource locator configured to locate a first data fragment can be inserted. In another aspect, a uniform resource locator configured to locate a second data fragment can be replaced with the uniform resource locator configured to locate the first data fragment. In one aspect, the manifest file can be generated based on an original manifest file. The original manifest file can be configured to provide playback of the media file based on the hardware and/or software specifications of a device that has access to the first plurality of data fragments and second plurality of data fragments during playback of the media file. For example, the original manifest file can specify that the second plurality of data fragments are in order of time of playback after the first plurality of data fragments. In one aspect, the device can be unable to provide playback based on the original manifest file. For example, the device can be unable to access a portion of the media file. The device can receive some of the media file (e.g., the second plurality of data fragments) but then be unable to continue receiving the remainder of the media file (e.g., the first plurality of data fragments) due to network connectivity problems, memory constraints, storage constraints, hardware failures, or the like. Accordingly, the manifest file can be generated to provide playback of the downloaded portion of the media file.

In step 408, the second plurality of data fragments can be provided. In one aspect, the second plurality of data fragments can be provided as a portion of the media file based on the manifest file (e.g., the manifest file generated in step 406). For example, the second plurality of data fragments can be provided based on a media consumption prediction. The media consumption prediction can be based on at least one of a device usage history, media download history, and a media viewing history. For example, the media consumption prediction can be a prediction by the prediction unit 124 of FIG. 1.

Figure 5:
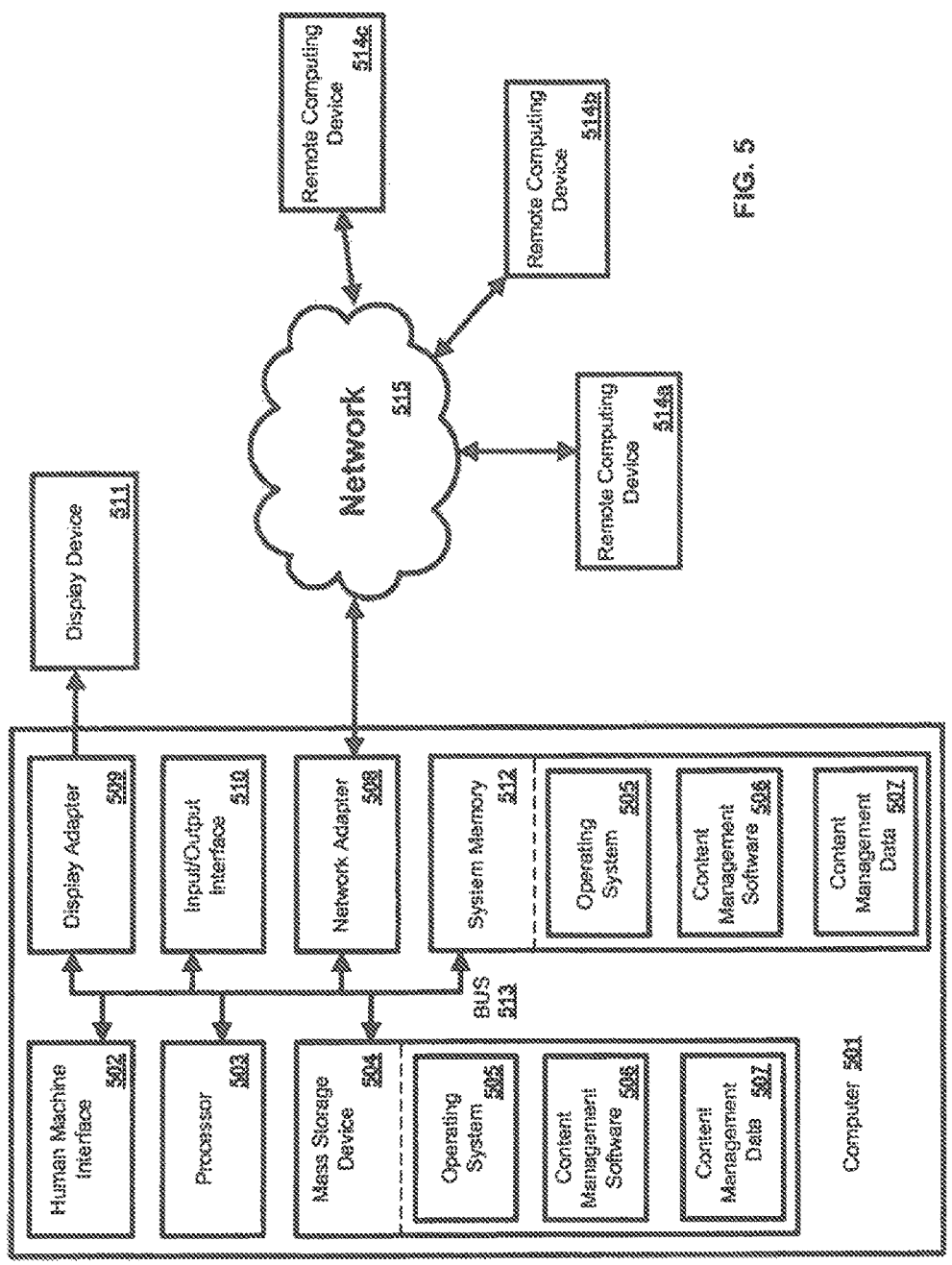
FIG. 5 is a block diagram illustrating an example computing device in which the present methods and systems can operate.

In an exemplary aspect, the methods and systems can be implemented on a computer 501 as illustrated in FIG. 5 and described below. By way of example, the content device 102, first user device 116, and/or second user device 118 of FIG. 1 can be a computer as illustrated in FIG. 5. Similarly, the methods and systems disclosed can utilize one or more computers to perform one or more functions in one or more locations. FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors or processing units 503, a system memory 512, and a system bus 513 that couples various system components including the processor 503 to the system memory 512. In the case of multiple processing units 503, the system can utilize parallel computing.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and each of the subsystems, including the processor 503, a mass storage device 504, an operating system 505, content management software 506, content management data 507, a network adapter 508, system memory 512, an Input/Output Interface 510, a display adapter 509, a display device 511, and a human machine interface 502, can be contained within one or more remote computing devices 514*a,b,c* at physically separate locations, connected through buses of this form, in effect implementing a fully distributed system.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as content management data 507 and/or program modules such as operating system 505 and content management software 506 that are immediately accessible to and/or are presently operated on by the processing unit 503.

In another aspect, the computer 501 can also comprise other removable/non-removable, volatile/non-volatile computer storage media. By way of example, FIG. 5 illustrates a mass storage device 504 which can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and content management software 506. Each of the operating system 505 and content management software 506 (or some combination thereof) can comprise elements of the programming and the content management software 506. Content management data 507 can also be stored on the mass storage device 504. Content management data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown) which can be connected to the computer 501 via Input/Output Interface 510. Any step and/or result of the methods can be output in any form to an output device. Such output can be any form of visual representation, including, but not limited to, textual, graphical, animation, audio, tactile, and the like. The display 511 and computer 501 can be part of one device, or separate devices.

The computer 501 can operate in a networked environment using logical connections to one or more remote computing devices 514a,b,c. By way of example, a remote computing device can be a personal computer, portable computer, smartphone, a server, a router, a network computer, a peer device or other common network node, and so on. Logical connections between the computer 501 and a remote computing device 514a,b,c can be made via a network 515, such as a local area network (LAN) and/or a general wide area network (WAN). Such network connections can be through a network adapter 508. A network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of content management software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Previously, digital video recordings were made on the digital recording devices (DVR) on which playback was performed (e.g., set-top boxes). In network DVR (e.g., DVR implemented from behind a network) scenarios, the recordings can be performed at a remote location and playback can occur either by streaming from that remote location or by downloading content from that remote location for subsequent local playback. This functionality presents a number of interesting challenges.

The present methods and systems can overcome a first challenge of having a finite amount of network bandwidth. Transferring recordings from the remote location to devices for playback can require significant network bandwidth, which is a limited shared resource for which capacity may vary widely over time. The present methods and systems can overcome the first challenge by predicting and downloading the portions of content that users are likely to consume on specific users device.

The present methods and systems can overcome a second challenge of limited transfer time. The sustained network bandwidth used for transferring recordings can be quite sizable. In order to transfer recordings in a practical fashion, devices can use a connection to a high-bandwidth network, which is typically tied to a fixed-location source (e.g., a high-bandwidth DOCSIS cable modem, either via direct connection or over a local WiFi network). This high-bandwidth network may be available to some devices (e.g., set-top boxes) but not to other devices, such as mobile devices (e.g., smartphones, tablets). The portable usage of mobile devices can, in some cases, impose limits on the amount of time available to transfer recordings from a network DVR. The present methods and systems can overcome the second challenge by predicting and downloading the portions of content that users are likely to consume on specific user devices, thereby limiting content from being transmitted across a network multiple times.

The present methods and systems can overcome a third challenge related to customer request latency. Due to the comparatively large file sizes for video content, the time used to download the content can be long enough that a user (e.g., customer) may not be able to download the entire content if the user does not allow enough time to download the content before disconnecting the device from the network. For example, a user may choose to watch a thirty-minute TV episode on the train, but the user may have a morning routine in which the customer does not begin downloading (e.g., by opening an application on a device) the content onto the mobile device until it is too late to download all the content. The present methods and systems can overcome the third challenge by automatically predicting and downloading the portions of content the user may watch on a device disconnected from the network.

The present methods and systems can overcome a fourth challenge related to the lack of benefit for content already viewed. For example, a user may download content to two different devices but view separate portions of the content on each device. The transfer of content that the customer has already viewed often provides little or no benefit to the customer. The present methods and systems can overcome the fourth challenge by predicting and downloading the portions of content to specific user devices that users are likely to consume on the specific users devices.

The present methods and systems can overcome a fifth challenge can comprise challenges raised by multiple bit-rate encoding. The advent of multiple bit-rate encodings utilized for adaptive playback can allow sync/download tradeoffs of content size for perceived content quality. The present methods and systems can overcome the fifth challenge by prioritizing portions of content and downloading the high priority portions at high bit-rates and low priority portions at low bit-rates. These five challenges, as well as other challenges, can be overcome by the present methods and systems.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   providing, to a first device, at least a portion of a media file;
   determining that a stop command or a pause command has been received by the first device;
   determining, after the stop command or the pause command has been received, a first plurality of data fragments of the media file and a second plurality of data fragments of the media file, wherein the second plurality of data fragments corresponds to a resume point indicating where a user is predicted to resume consumption of the media file on a second device; and
   generating a manifest file for resuming consumption of the media file at the resume point, wherein the manifest file comprises information for playback of the second plurality of data fragments on the second device without requesting access to the first plurality of data fragments by the second device.

2. The method of claim 1, wherein the information for playback of the second plurality of data fragments comprises at least one of a temporal playback order of the second plurality of data fragments or location identifiers indicating locations at which to retrieve the second plurality of data fragments.

3. The method of claim 1, wherein generating the manifest file comprises re-indexing the second plurality of data fragments.

4. The method of claim 3, wherein re-indexing the second plurality of data fragments comprises indexing the second plurality of data fragments as a beginning of the media file instead of the first plurality of data fragments.

5. The method of claim 1, wherein generating the manifest file comprises replacing a first location identifier indicating a first location of a data fragment with a second location identifier indicating a second location of the data fragment.

6. The method of claim 1, wherein generating the manifest file comprises generating, based on an original manifest file, the manifest file, wherein the original manifest file specifies that the second plurality of data fragments are in order of time of playback after the first plurality of data fragments.

7. The method of claim 1, further comprising determining the resume point based on a device usage history.

8. An apparatus, comprising:
   one or more processors; and
   a memory storing processor executable instructions that, when executed by the one or more processors, cause the apparatus to:

provide, to a first device, at least a portion of a media file;

determine that a stop command or a pause command has been received by the first device;

determine, after the stop command or the pause command has been received, a first plurality of data fragments of the media file and a second plurality of data fragments of the media file, wherein the second plurality of data fragments corresponds to a resume point indicating where a user is predicted to resume consumption of the media file on a second device; and generate a manifest file for resuming consumption of the media file at the resume point, wherein the manifest file comprises information for playback of the second plurality of data fragments on the second device without requesting access to the first plurality of data fragments by the second device.

9. The apparatus of claim 8, wherein the information for playback of the second plurality of data fragments comprises at least one of a temporal playback order of the second plurality of data fragments or location identifiers indicating locations at which to retrieve the second plurality of data fragments.

10. The apparatus of claim 8, wherein the processor executable instructions that, when executed by the one or more processors, cause the apparatus to generate the manifest file further cause the apparatus to re-index the second plurality of data fragments.

11. The apparatus of claim 10, wherein the processor executable instructions that, when executed by the one or more processors, cause the apparatus to re-index the second plurality of data fragments further cause the apparatus to index the second plurality of data fragments as a beginning of the media file instead of the first plurality of data fragments.

12. The apparatus of claim 8, wherein the processor executable instructions that, when executed by the one or more processors, cause the apparatus to generate the manifest file for further cause the apparatus to replace a first location identifier indicating a first location of a data fragment with a second location identifier indicating a second location of the data fragment.

13. The apparatus of claim 8, wherein the processor executable instructions that, when executed by the one or more processors, cause the apparatus to generate the manifest file further cause the apparatus to generate, based on an original manifest file, the manifest file, wherein the original manifest file specifies that the second plurality of data fragments are in order of time of playback after the first plurality of data fragments.

14. The apparatus of claim 8, wherein the processor executable instructions, when executed by the one or more processors, further cause the apparatus to determine the resume point based on a device usage history.

15. A non-transitory computer-readable medium storing processor executable instructions that, when executed by at least one computing device, cause the at least one computing device to:

provide, to a first device, at least a portion of a media file;

determine that a stop command or a pause command has been received by the first device;

determine, after the stop command or the pause command has been received, a first plurality of data fragments of the media file and a second plurality of data fragments of the media file, wherein the second plurality of data fragments corresponds to a resume point indicating where a user is predicted to resume consumption of the media file on a second device; and generate a manifest file for resuming consumption of the media file at the resume point, wherein the manifest file comprises information for playback of the second plurality of data fragments on the second device without requesting access to the first plurality of data fragments by the second device.

16. The non-transitory computer-readable medium of claim 15, wherein the information for playback of the second plurality of data fragments comprises at least one of a temporal playback order of the second plurality of data fragments or location identifiers indicating locations at which to retrieve the second plurality of data fragments.

17. The non-transitory computer-readable medium of claim 15, wherein the processor executable instructions that, when executed by the at least one computing device, cause the at least one computing device to generate the manifest file further cause the at least one computing device to re-index the second plurality of data fragments.

18. The non-transitory computer-readable medium of claim 17, wherein the processor executable instructions that, when executed by the at least one computing device, cause the at least one computing device to re-index the second plurality of data fragments further cause the at least one computing device to index the second plurality of data fragments as a beginning of the media file instead of the first plurality of data fragments.

19. The non-transitory computer-readable medium of claim 15, wherein the processor executable instructions that, when executed by the at least one computing device, cause the at least one computing device to generate the manifest file for further cause the at least one computing device to replace a first location identifier indicating a first location of a data fragment with a second location identifier indicating a second location of the data fragment.

20. The non-transitory computer-readable medium of claim 15, wherein the processor executable instructions that, when executed by the at least one computing device, cause the at least one computing device to generate the manifest file further cause the at least one computing device to generate, based on an original manifest file, the manifest file, wherein the original manifest file specifies that the second plurality of data fragments are in order of time of playback after the first plurality of data fragments.

* * * * *